United States Patent
Beliaev (10) Patent No.: US 12,503,060 B2
(45) Date of Patent: Dec. 23, 2025

(54) DEVICE FOR RELOCATING A DISPLAY-SCREEN ARRANGEMENT RELATIVE TO A VEHICLE ROOF IN A VEHICLE INTERIOR

(71) Applicant: BOS GmbH & Co. KG, Ostfildern (DE)

(72) Inventor: Grigorii Beliaev, Esslingen (DE)

(73) Assignee: BOS GMBH & CO. KG, Ostfildern (DE)

( * ) Notice: Subject to any disclaimer, the term of this patent is extended or adjusted under 35 U.S.C. 154(b) by 374 days.

(21) Appl. No.: 18/456,774

(22) Filed: Aug. 28, 2023

(65) Prior Publication Data
US 2024/0075886 A1   Mar. 7, 2024

(30) Foreign Application Priority Data
Sep. 2, 2022   (DE) .......................... 102022209124.8

(51) Int. Cl.
*B60R 11/02*   (2006.01)
*B60R 11/00*   (2006.01)

(52) U.S. Cl.
CPC ... *B60R 11/0229* (2013.01); *B60R 2011/0028* (2013.01)

(58) Field of Classification Search
CPC ..................... B60R 11/0229; B60R 2011/0028
USPC ......................................................... 296/214
See application file for complete search history.

(56) References Cited

U.S. PATENT DOCUMENTS

| | | | |
|---|---|---|---|
| 4,728,181 A * | 3/1988 | Kakinuma | B60R 1/06 248/478 |
| 7,497,580 B2 | 3/2009 | Lang et al. | |
| 11,358,450 B2 | 6/2022 | Eger | |
| 2003/0063402 A1* | 4/2003 | Lang | B60R 1/0612 359/872 |
| 2011/0133028 A1* | 6/2011 | Riedel | B60R 11/0235 248/276.1 |
| 2020/0290442 A1* | 9/2020 | Eger | B60R 11/0235 |
| 2021/0070233 A1* | 3/2021 | Podolski | B60R 11/0235 |
| 2021/0162931 A1* | 6/2021 | Bruegl | F16M 11/2028 |

(Continued)

FOREIGN PATENT DOCUMENTS

| | | | | |
|---|---|---|---|---|
| CN | 116653788 A * | 8/2023 | ......... | B60R 11/0229 |
| CN | 117794788 A * | 3/2024 | ......... | B60R 11/0235 |
| CN | 118107486 A * | 5/2024 | ............... | B60J 7/00 |

(Continued)

*Primary Examiner* — Hilary L Gutman
(74) *Attorney, Agent, or Firm* — FLYNN THIEL, P.C.

(57) ABSTRACT

A device for relocating a display-screen arrangement relative to a vehicle roof in a vehicle interior, including a knee-joint arrangement with a main lever, with which main lever the display-screen arrangement is resistant to torsion, and a control lever connected in an articulated manner to the main lever. Both the main lever and the control lever are rotationally moveable about a bearing. The bearings are linearly traversable along a guide rail, and are relatively movable with respect to one another along the guide rail via a positive-control device. The positive-control device has a control roller extending along the guide rail and supported for rotational movement about an axis of rotation oriented parallel to the guide rail. The control roller is mechanically coupled via cams with the bearings which are relatively movable with respect to one another.

9 Claims, 9 Drawing Sheets

(56) References Cited

U.S. PATENT DOCUMENTS

2025/0026281 A1* 1/2025 Teufel .................... B60K 35/60

FOREIGN PATENT DOCUMENTS

| | | | | |
|---|---|---|---|---|
| DE | 10148611 | A1 | 4/2003 | |
| DE | 102009057017 | A1 * | 6/2011 | ......... B60R 11/0235 |
| DE | 102018129479 | A1 * | 5/2020 | ......... B60R 11/0229 |
| DE | 102019101397 | B3 * | 6/2020 | ......... B60R 11/0235 |
| DE | 102019118998 | A1 | 9/2020 | |
| DE | 102022109666 | B3 * | 7/2023 | ......... B60R 11/0235 |
| DE | 102022131704 | A1 * | 6/2024 | ......... B60R 11/0235 |
| EP | 3708432 | A2 * | 9/2020 | ......... B60R 11/0235 |
| EP | 3708432 | B1 | 9/2020 | |
| FR | 2161491 | A5 * | 7/1973 | |
| JP | 2004149057 | A * | 5/2004 | |
| JP | 2004182049 | A * | 7/2004 | |
| JP | 2007314057 | A * | 12/2007 | |
| JP | 2015134573 | A * | 7/2015 | |
| WO | WO-2023194092 | A1 * | 10/2023 | ............. B60K 35/22 |

* cited by examiner

DEVICE FOR RELOCATING A DISPLAY-SCREEN ARRANGEMENT RELATIVE TO A VEHICLE ROOF IN A VEHICLE INTERIOR

CROSS-REFERENCE TO RELATED APPLICATION

This claims priority from German Application No. 10 2022 209 124.8, filed Sep. 2, 2022, the disclosure of which is hereby incorporated by reference in its entirety.

TECHNICAL FIELD

The invention relates to a device for relocating a display-screen arrangement relative to a vehicle roof in a vehicle interior between a rest position, at least largely parallel to the roof, and an operational position oriented at least largely in the vertical direction of the vehicle, with a knee-joint arrangement which has a main lever, with which the display-screen arrangement is resistant to torsion, and also a control lever connected in an articulated manner to the main lever, both the main lever and the control lever being supported so as to be movable in rotation about a bearing in each instance, said bearings being traversable along a guide rail in a linearly movable manner and being relatively movable with respect to one another along the guide rail by means of a positive-control device.

BACKGROUND AND SUMMARY

A device of such a type is known from EP 3 708 432 B1. The display-screen arrangement is retained on a swiveling structure which is additionally relocatable in the longitudinal direction of the vehicle in guide rails on the roof side. The swiveling structure exhibits a control lever and also a latching device for the rest position. The control lever is capable of being swiveled out in a downward direction by means of a toothed wheel and a drive system, in order to transfer the display-screen arrangement out of the rest position into the operational position.

One aspect of the invention is to create a device of the type mentioned in the introduction that is of simple and space-saving construction.

This is achieved in that the positive-control device has a control roller, extended along the guide rail and supported so as to be movable in rotation about an axis of rotation oriented parallel to the guide rail, which is mechanically coupled via control cams with the bearings which are relatively movable with respect to one another. The guide rail may have been realized both in the form of a guide channel and in the form of a guide bar. Correspondingly complementary to this, the bearings for the main lever and for the control lever have been realized as sliding elements formed in the guide channel, or as sliding shoes retained on the guide bar. In accordance with the invention, the control roller with its control cams and with the coupling to the bearings performs a blocking and enabling function for the relative mobility of the bearings, so that the display-screen arrangement has been secured in one of its two end positions—that is to say, in the rest position or in the operational position—in the case of blocking of the relative mobility of the bearings, or is released in the case of enabling of the relative mobility for a swiveling motion out of the rest position into the operational position, or conversely. As a result, a particularly simple and operationally reliable structure arises which manages with few components and makes space-saving accommodation possible. In addition, the control roller makes possible particularly low-noise enabling or blocking of the relative mobility of the bearings.

In a refinement, the control roller is supported so as to be movable in rotation on opposing front-end regions between two guide sliders which are guided along the guide rail in longitudinally relocatable manner. This makes a robust, maintenance-free and rattle-free rotary support of the control roller possible.

In a further refinement, one guide slider forms the bearing for the control lever or main lever. As a result, a dual function has been assigned to the guide slider, in that it forms both a rotary bearing for the control roller and the bearing for the control lever or for the main lever.

In a further refinement, a control slider that forms the other bearing for the main lever or for the control lever is guided so as to be longitudinally relocatable on the guide rail. The control slider is movably arranged relative to the guide sliders.

In a further refinement, the control cams have been configured in such a manner that by torsion of the control roller a relative mobility between the two bearings of the main lever and of the control lever is enabled or blocked. The two bearings are preferentially formed by the guide slider, on the one hand, and by the control slider, on the other.

In a further refinement, two control cams have been provided and have been realized as control runners arranged in distributed manner over a periphery of the control roller, and the control slider exhibits a control pin engaging with one control runner, and the guide rail exhibits a guide pin, fixed with respect to the rail and engaging with the second control runner. On the one hand, the control roller is longitudinally traversable along the guide rail by means of its guide sliders. On the other hand, the control roller is movable in rotation to a limited extent relative to its guide sliders. The guide pin on the guide rail, which engages with the second control runner of the control roller, necessarily brings about the desired rotary motion in the event of a longitudinal relocation of the control runner along the guide rail. Since the control slider connected to the control lever is also permanently coupled with the control roller by means of the control pin engaging with the other control runner, a rotation of the control roller can make possible a release of the control slider for a longitudinal relocation relative to the control roller and therefore relative to the guide sliders. The corresponding control runner for the control pin of the control slider has been realized in such a way that in the event of torsion of the control roller by the guide pin which is fixed with respect to the rail the control slider is released for the corresponding relative mobility and is latched again in the corresponding other end position by further torsion.

In a further refinement, the guide rail has been realized as a guide channel, and the control roller, including the guide sliders, has been spatially integrated within the guide channel. This is a particularly space-saving design, since the device exhibits no positive-control elements protruding in a downward direction over the guide rail toward the center of the vehicle in the transverse direction of the vehicle.

In a further refinement, a drive system has been provided, in order to traverse the bearings of the knee-joint arrangement along the guide rail. The drive system exhibits an electric drive motor and also tension-resistant and pressure-resistant drive-transmission trains which are guided synchronously with respect to one another on opposing guide rails which flank the display-screen arrangement on opposing sides. The previously described features that have been assigned to one guide rail have been assigned in like manner to the opposing guide rail in appropriately mirror-symmetrical fashion, so that the display-screen arrangement is supported on opposing sides so as to be capable of swiveling motion, synchronously in each instance.

In a further refinement, in the region of the guide rail the drive system exhibits a tension-resistant and pressure-resistant drive-transmission train which acts upon the control slider in order to relocate the control slider on its own or together with the control roller and the guide sliders. In the region of the opposing guide rail, the same holds in analogous manner. A screw-pitch cable or a flexible toothed rack has preferentially been provided as drive-transmission train.

Further advantages and features of the invention arise out of the claims and also out of the following description of preferred exemplary embodiments of the invention, which have been represented on the basis of the drawings.

DETAILED DESCRIPTION

Figure 1:
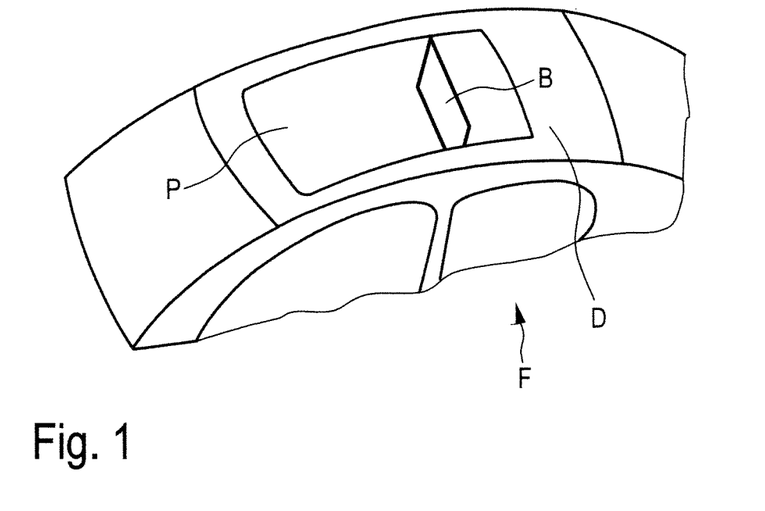
FIG. 1 shows schematically a roof region of a passenger car, to which a display-screen arrangement has been assigned in the vehicle interior.
Figure 2:
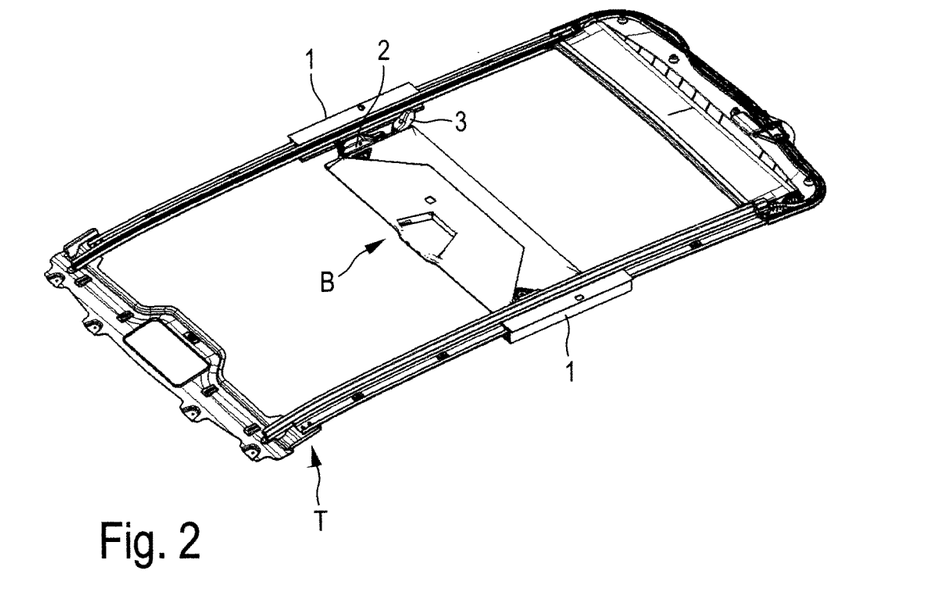
FIG. 2 shows in perspective representation, an embodiment of a device according to the invention for relocating the display-screen arrangement relative to the roof region according to FIG. 1, the display-screen arrangement being shown in a rest position.
Figure 3:
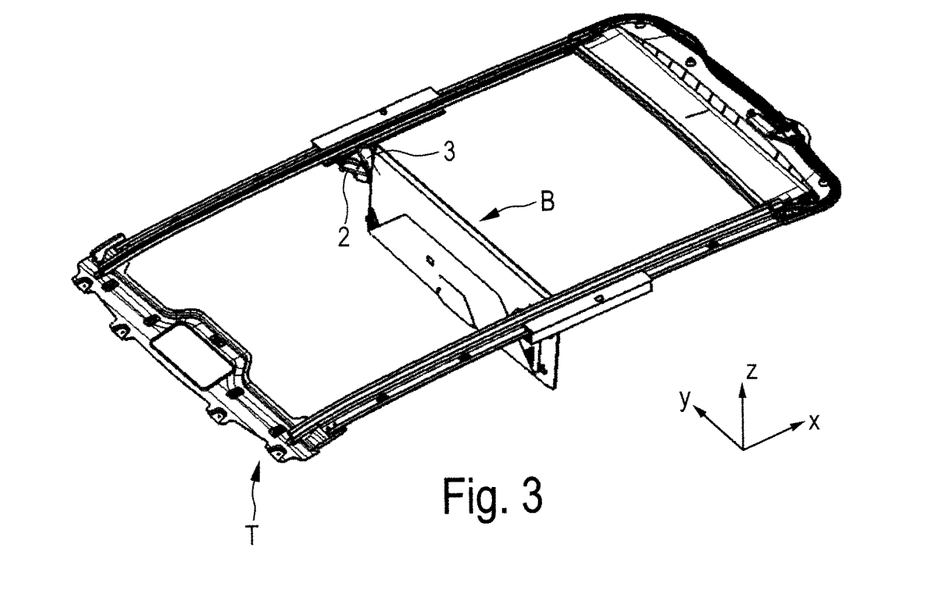
FIG. 3 shows the device in the roof region according to FIG. 2, but with the display-screen arrangement in its operational position.

According to FIG. 1, a passenger car F exhibits a passenger compartment with a vehicle interior which in the vertical direction of the vehicle is bounded upward by a roof structure D. The roof structure D exhibits a transparent roof region P which may be fixed or may have been provided with roof parts capable of being opened. According to FIG. 2, the transparent roof region P has been fastened by means of a support frame T to the roof structure which bears, below the transparent roof region P, the device, described in more detail below, for relocating a display-screen arrangement B between a rest position parallel to the roof, according to FIG. 2, and an operational position lowered downward in the vertical direction of the vehicle (z according to FIG. 3). The support frame T exhibits two longitudinal supports extended in the longitudinal direction of the vehicle (x in FIG. 3) and spaced from one another in parallel in the transverse direction of the vehicle (y in FIG. 3), to each of which, in an at least largely central region on opposing sides, a guide rail 1 has been fastened which serves for retaining and traversing a knee-joint arrangement 2, 3 in each instance. The respective knee-joint arrangement 2, 3 bears the display-screen arrangement B on one side in each instance, so that the display-screen arrangement B is flanked on its opposing sides by a knee-joint arrangement 2, 3 in each instance. The device according to the invention will be described below merely for one side. What is said, however, holds in like manner for the other side, the corresponding operational parts of the other side being mirror-symmetrical with respect to a vertical median longitudinal plane of the vehicle, but being configured identically in other respects.

Figure 5:
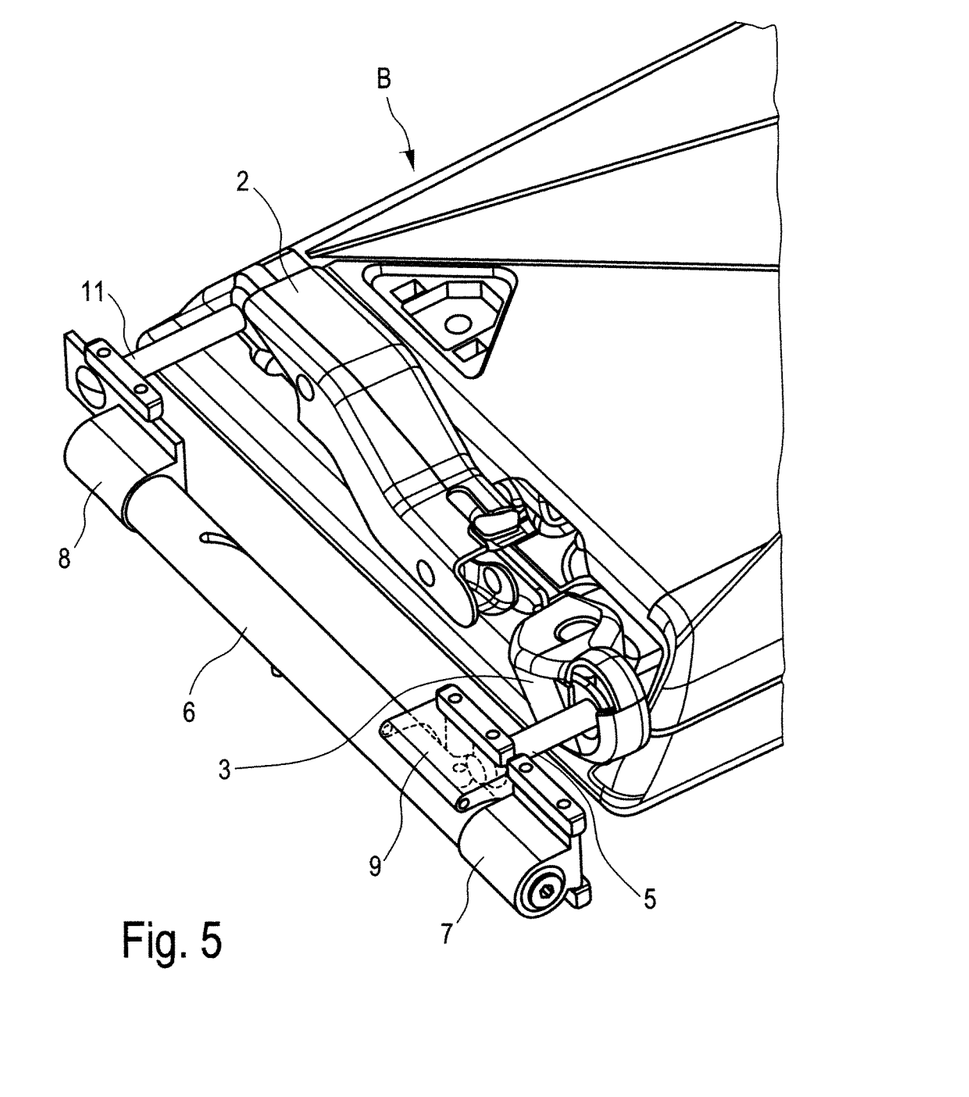
FIG. 5 shows in perspective representation, a subregion of the device according to FIG. 2.

The knee-joint arrangement exhibits a main lever 3 and also a control lever 2. The main lever 3 is firmly connected to a corresponding side region of the display-screen arrangement B and, in addition, is supported by means of a bearing pin 5 (FIG. 5) so as to be movable in rotation on a bearing of a control slider 9 which is guided so as to be capable of sliding motion in a guide channel 4 of the guide rail 1 in the longitudinal direction of the vehicle and therefore along the guide rail 1. The bearing pin 5 has been extended in the transverse direction of the vehicle, so that the corresponding bearing on the control slider 9 constitutes a swivel axis, extended in the transverse direction of the vehicle, for the main lever 3 and therefore also for the display-screen arrangement B.

A control lever 2, which is supported by means of another bearing pin 11, spaced from the bearing pin 5 of the main lever 3 in the longitudinal direction of the vehicle, on a bearing of a guide slider 8 so as to be capable of swiveling parallel to the main lever 3, is connected to the main lever 3 in articulated manner. Guide slider 8 is likewise supported in the guide channel 4 of the guide rail 1 so as to be displaceable by linear sliding motion in the longitudinal direction of the vehicle.

Figure 4:
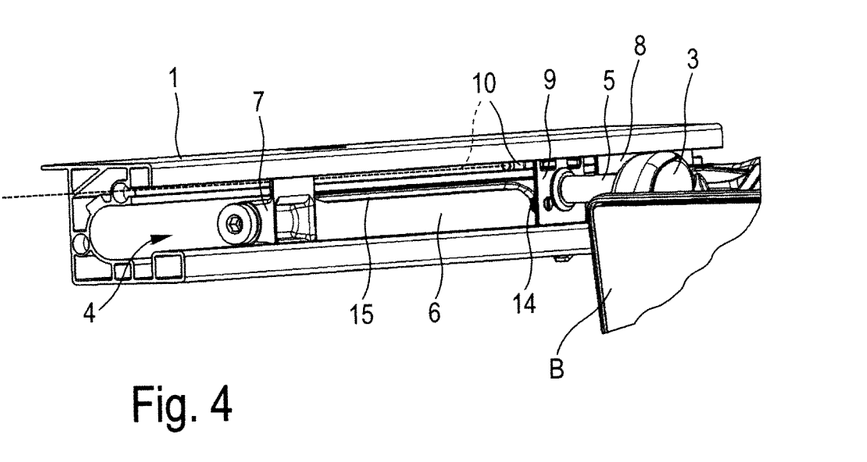
FIG. 4 shows in an enlarged perspective representation, a detail of the device according to FIGS. 2 and 3.

Guide slider 8 constitutes, in addition, a rotary bearing for a control roller 6 which has been extended in the longitudinal direction of the vehicle in the guide channel 4 of the guide rail 1 and is supported so as to be movable in rotation on an opposing front-end region by means of a further rotary bearing on a further guide slider 7 about an axis of rotation extended parallel to the guide channel 4 of the guide rail 1. The control roller 6 has been realized as a cylindrical component, preferentially made of metal, and extends between the two guide sliders 7 and 8, each of which constitutes a front-end rotary bearing for the control roller 6. Guide slider 7 is also retained so as to be displaceable by sliding motion in the guide channel 4 of the guide rail 1. Both the two guide sliders 7 and 8 and the control slider 9 exhibit corresponding sliding shoes, in order to make possible a linear sliding mobility in the guide channel 4. The sliding shoes extend upward and downward in the vertical direction of the vehicle and are retained so as to be capable of sliding in the longitudinal direction of the vehicle in groove-like recesses on the upper side and on the lower side of the guide channel 4. The control roller 6 has been spatially integrated within a semicylindrical guide section of the guide channel 4 (FIG. 4).

The cylindrical control roller 6 exhibits on its outer periphery two control runners 12 and 15, separated from one another, which have been realized as grooves sunk into an outer sheath of the control roller 6. Control runner 12 exhibits two rectilinear runner sections extended along the control roller, which in a central region lead into a V-shaped runner section. Approximately opposite, the other control runner 15 has been inserted into the sheath of the control roller 6 which exhibits a runner section, extended in the longitudinal direction of the control roller 6, which at its opposing ends merges with, in each instance, an angled end section of the runner.

Figure 6:
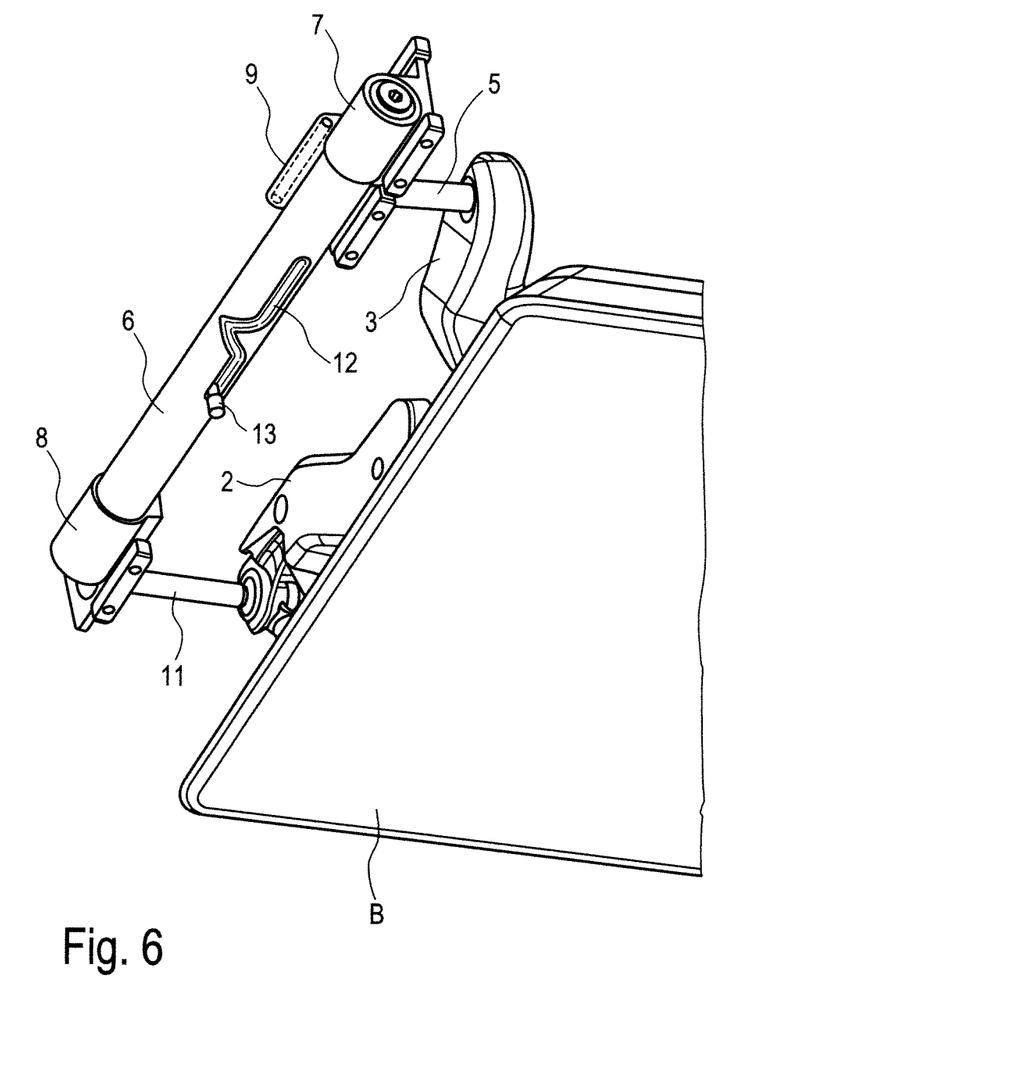
FIG. 6 shows in another perspective representation, the subregion according to FIG. 5.
Figure 7:
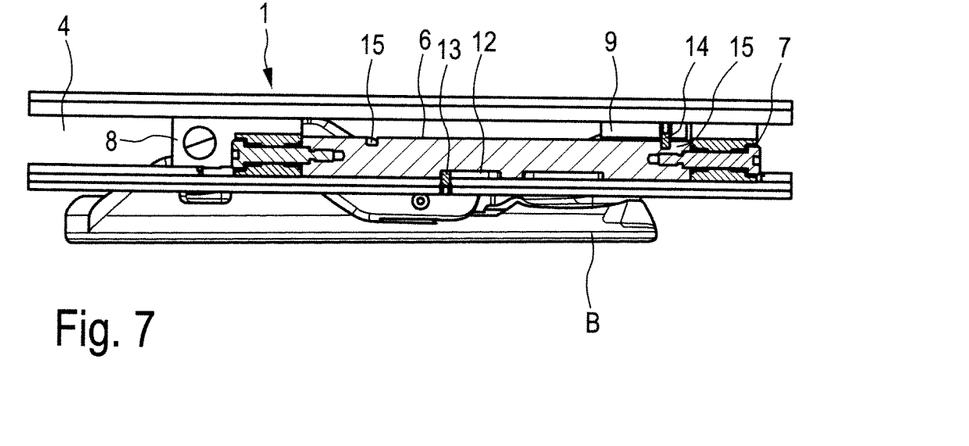
FIG. 7 shows a longitudinal section in the region of a guide rail of the device according to FIGS. 2 to 6.
Figure 8:
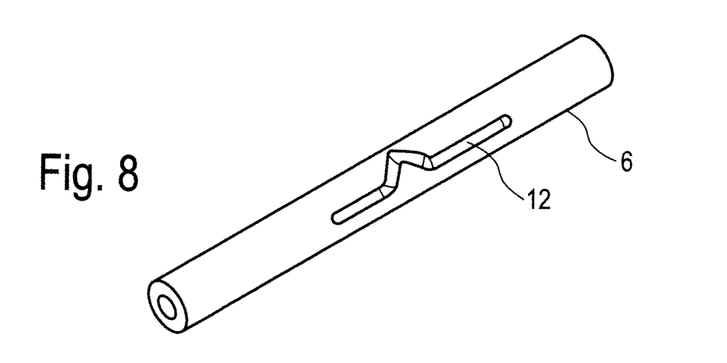
FIG. 8 shows in perspective representation, a control roller of the device according to FIGS. 2 to 7.
Figure 9:
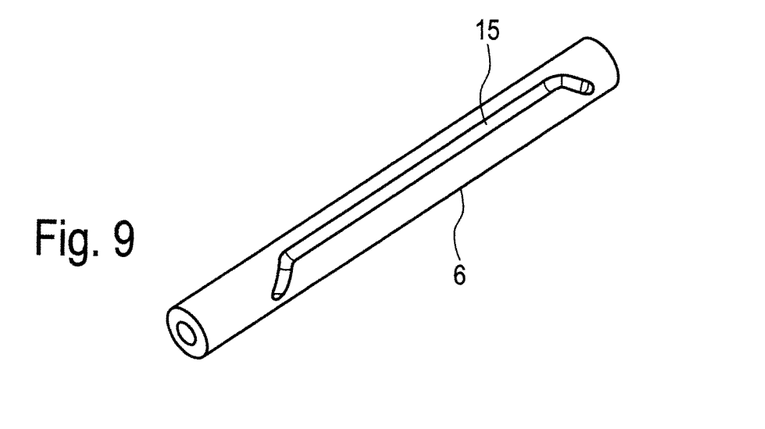
FIG. 9 shows the control roller according to FIG. 8 from an opposing perspective.
Figure 10:
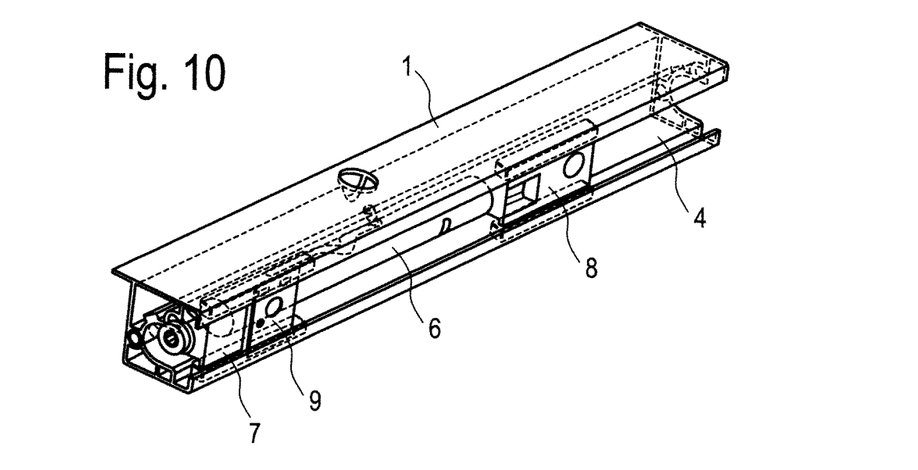
FIG. 10 shows a perspective representation of guide sliders and a control slider with control roller within the guide rail of the device according to FIGS. 2 to 9.
Figure 11:
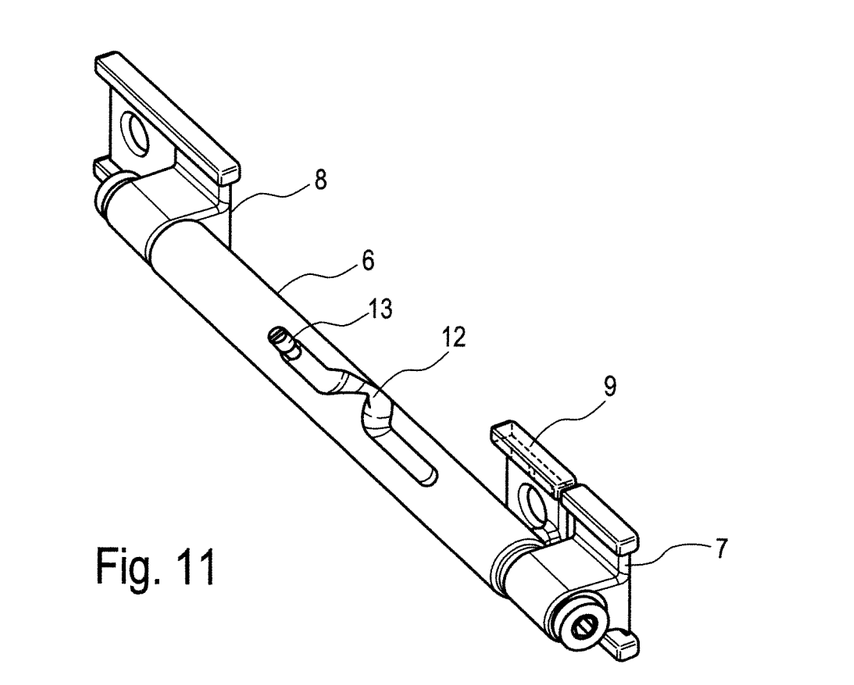
FIGS. 11 to 16 show in various perspective representations, the operational parts according to FIG. 10, omitting the guide rail, and in differing operational positions.
Figure 12:
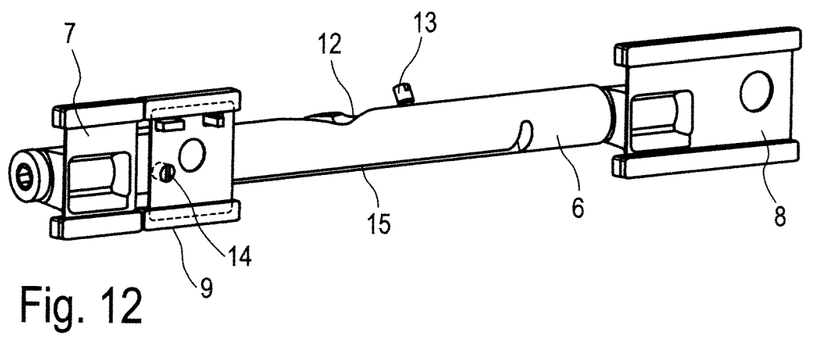

Two runner pins, described in more detail below, have been assigned to the two control runners 12 and 15. A first runner pin in the form of a control pin 14 has been provided on the control slider 9 and engages with control runner 15. A second runner pin in the form of a guide pin 13 engages with control runner 12. The guide pin 13 has been provided on the guide rail 1, fixed with respect to the rail, and protrudes into the guide channel 4 in the transverse direction of the vehicle. According to FIGS. 5 to 7, the guide pin 13 has been provided on the lower side of the guide channel 4 and protrudes upward in the vertical direction of the vehicle into the guide channel 4. The control pin 14 of the control slider 9 protrudes in opposing manner from above into the other control runner 15. The arrangement and orientation of the control runners and of the runner pins can be chosen freely within the scope of the design conditions, so that the variant represented on the basis of FIGS. 5 to 7 constitutes merely one of several possibilities for the positioning of the runner pins and of the control runners of the control roller 6.

In the embodiment according to FIGS. 10 to 16, the control pin of the control slider 9 protrudes outward substantially in the transverse direction of the vehicle, and the guide pin 13, which engages with control runner 12 of the control roller 6, protrudes obliquely inward and downward from a rear side of the guide channel 4.

Irrespective of the chosen variants of the orientation for runner pins and control runners, the following mode of operation arises.

The control slider 9, which bears the main lever 3 for swiveling the display-screen arrangement B, has been blocked in an initial position in which the display-screen arrangement B is located in its rest position parallel to the roof, directly adjacent to guide slider 7. In this position, the control roller 6 has been secured by the guide pin 13 in a rotary orientation in which the control pin 14 of the control slider 9 is located in the end section of control runner 15, extended in the peripheral direction of the control roller 6. The orientation of this end section of the runner, inclined in the peripheral direction, has the effect that the control slider 9 with its control pin 14 cannot move along the control roller 6.

Figure 13:
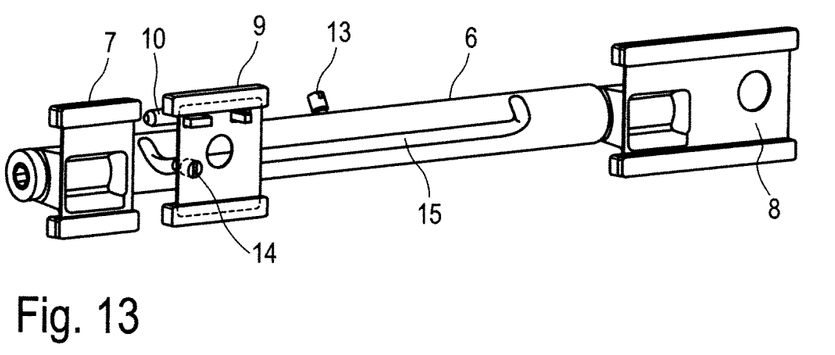
Figure 14:
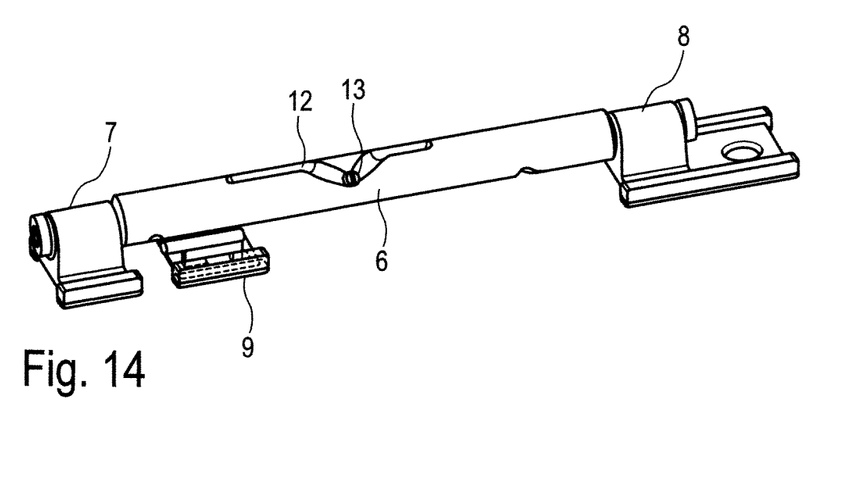
Figure 15:
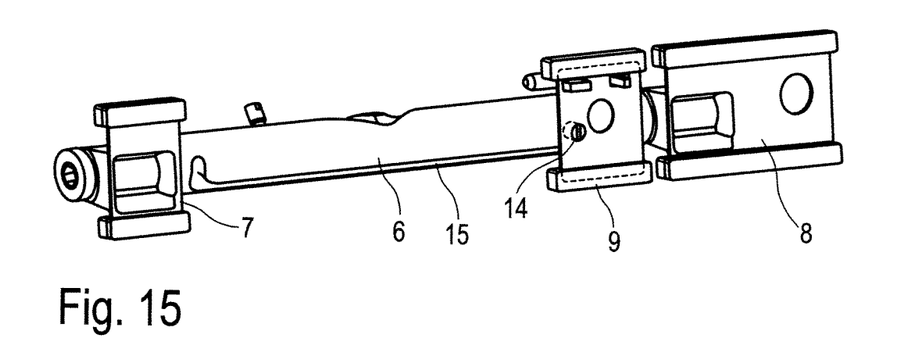
Figure 16:
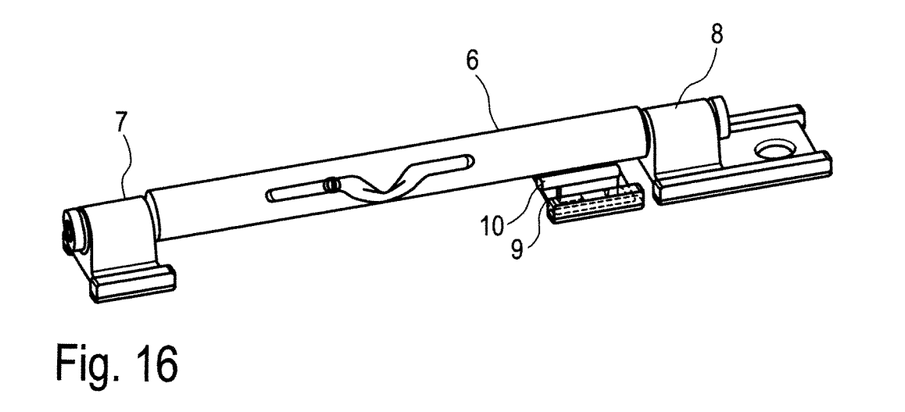

A tension-resistant and pression-resistant drive-transmission train 10—in the present case, in the form of a screw-pitch cable which has been positively coupled at its end with the control slider 9—has been assigned to the control slider 9, as can be inferred from FIG. 4 and FIG. 13. The drive-transmission train 10 is guided in longitudinally movable manner in a drive channel of the guide rail 1, which has been provided above the semicylindrical channel section of the guide channel 4. For the purpose of relocating the drive-transmission train 10 along the drive channel, an electric drive motor of a drive system which is not indicated in any detail has been provided. The electric drive motor has been fastened to the support frame T in the region of a front or rear cross-beam, as can be inferred from FIGS. 2 and 3. The electric drive motor is shown schematically in the region of the right cross-beam in FIGS. 2 and 3. Also shown schematically therein are corresponding drive-channel sections for guiding the drive-transmission trains 10 toward the opposing guide rails 1.

As soon as the electric drive motor is activated, the drive-transmission train 10 moves in the longitudinal direction of the vehicle along the corresponding drive channel of the guide rail and, by reason of the positive coupling with the control slider 9, entrains this control slider 9 in the same direction in the guide channel 4. So long as the control slider 9 is blocked by the control roller 6, since the control pin 14 of the control slider 9 is located in the inclined end section of control runner 15, the drive-transmission train 10 necessarily also entrains the control roller 6 with its two guide sliders 7 and 8 along the guide channel 4. As a result, the display-screen arrangement B is also necessarily relocated in the longitudinal direction of the vehicle along the underside of the transparent roof region P.

Since, by virtue of the engagement of the guide pin 13 with the other control runner 12, the control roller 6 cannot turn in the course of the longitudinal relocation of the guide sliders 7 and 8 and of the control roller 6, so long as the guide pin 13 is guided in the runner sections of control runner 12 extending rectilinearly parallel to the control roller 6 the control roller 6 and the guide sliders 7 and 8 are relocated jointly together with the relocation of the control slider 9. As soon as the guide pin 13 reaches the V-shaped runner section of control runner 12, a rotation of the control roller 6 necessarily takes place during the further longitudinal relocation of the control roller 6. By this means, the control pin 14 necessarily slides into the runner section of control runner 15 extending in the longitudinal direction, as a result of which a relative motion of the control slider 9 relative to the guide sliders 7 and 8 is enabled. In this position, the guide pin 13 which is fixed with respect to the rail has reached the apex of the V-shaped runner section of control runner 12, so that the control roller 6 has been blocked in the longitudinal direction of the guide channel 4. Since the drive-transmission train continues to drive the control slider 9, the control slider 9 moves, in accordance with the representations according to FIGS. 10 to 14, away from guide slider 7 and in the direction of guide slider 8 which constitutes the bearing for the control lever 2. By virtue of this relative motion between the control slider 9, which constitutes the bearing for the main lever 3, and guide slider 8, which constitutes the bearing for the control lever 2, the main lever 3 and the control lever 2 are necessarily deflected in a downward direction, as a result of which the display-screen arrangement B, which with the main lever 3 is resistant to torsion, swings out from its rest position, parallel to the roof, in a downward direction into the operational position. As soon as the control slider 9 with its control pin 14 reaches the opposing end section, inclined in the peripheral direction, of control runner 15, the control roller 6 rotates back again as a result of sliding of the guide pin 13 in the adjacent V-shank of the V-shaped runner section. The control pin 14 rotates into the end section of control runner 15, extended substantially in the peripheral direction, and the guide pin 12 enters the runner section of control runner 12, parallel to the longitudinal extent of the control roller 6. The entire unit consisting of guide sliders 7, 8 and control roller 6 can now be traversed still further in the longitudinal direction of the vehicle together with the control slider 9 which is blocked in its relative motion relative to guide slider 8, as a result of which the display-screen arrangement B can also be relocated in the longitudinal direction of the vehicle in its downwardly lowered operational position. In the process, the guide pin 13 slides into the rectilinear runner section of control runner 12, adjoining the second V-shank of the V-shaped runner section and extended in the longitudinal direction of the vehicle. If the drive-transmission train 10 is driven in an appropriately reversed direction, in correspondingly reversed manner a return of the display-screen arrangement B into its operational position and a subsequent swiveling upward into the rest position as well as a traversing of the display-screen arrangement B in its rest position in the longitudinal direction of the vehicle as far as a parked position take place. The relative motion of the control slider 9 relative to the guide sliders 7 and 8 accordingly brings about either a lowering—that is to say, an unfolding—of the display-screen arrangement B or, in converse manner, a folding upward of the display-screen arrangement B. Subsequently the control slider has been blocked in its relative motion with respect to the guide sliders 7, 8, so that the display-screen arrangement B has also been blocked in the rest position or in the operational position with respect to its swivel orientation. Irrespective of this, both in the rest position and in the operational position of the display-screen arrangement B a longitudinal relocation of the guide sliders 7 and 8 and of the control slider 9 in the guide channel 4 of the guide rail 1 can take place, so that the display-screen arrangement B can still be displaced in the longitudinal direction of the vehicle, both in the rest position and in the operational position. In the rest position, a displacement of the display-screen arrangement B in the longitudinal direction of the vehicle brings about a transfer into a parked position. In the operational position, a traversing of the display-screen arrangement B in the longitudinal direction of the vehicle along the guide rails 1 brings about a transfer into an activation position in which the display-screen arrangement B can be utilized by an occupant of the vehicle by calling up appropriate virtual contents on the display-screen arrangement.

Figure 17A:
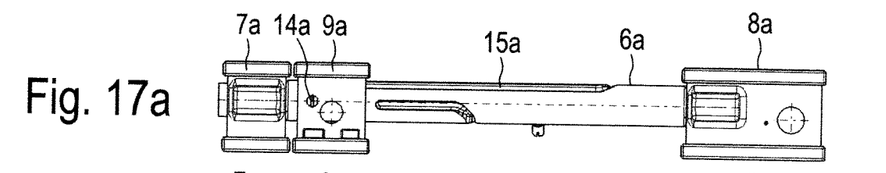
FIGS. 17a and 17b show another embodiment of a device according to the invention similar to FIGS. 2 to 16, with differently configured control runners in the region of the control roller, and in side views in the transverse direction of the vehicle from outside and from inside.
Figure 17B:
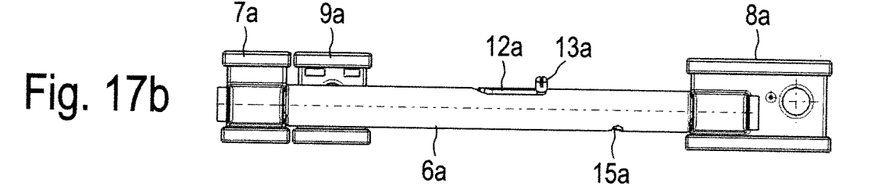
Figures 18A, 18B:
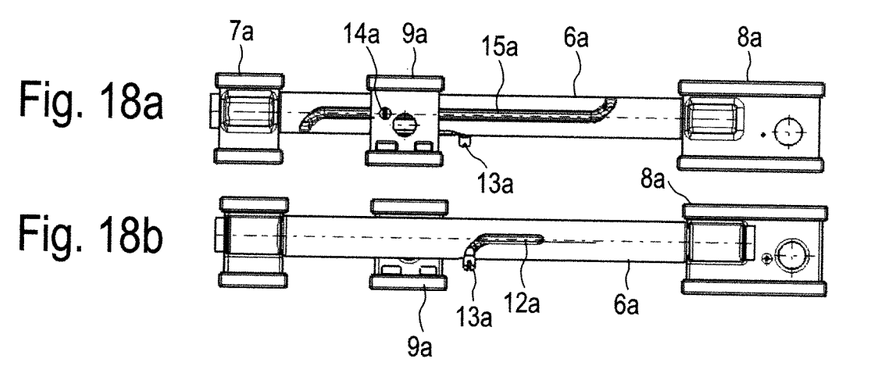
FIG. 18a, FIG. 18b, FIG. 19a and FIG. 19b show the subregion according to FIGS. 17a and 17b in the two different views and in various working positions of the control slider.
Figures 19A, 19B:
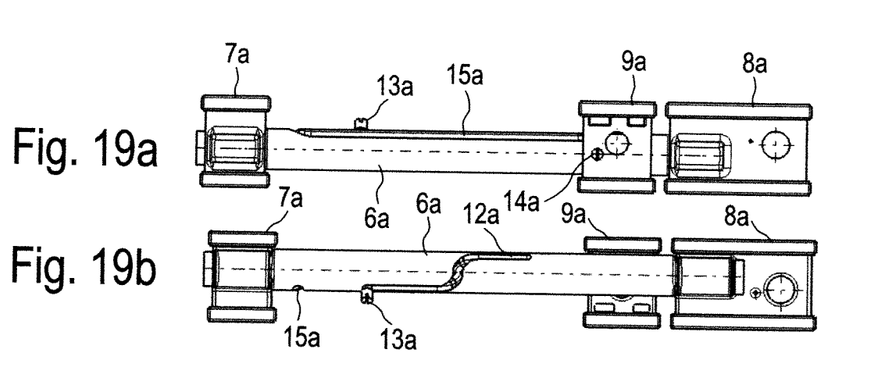

The embodiment represented on the basis of FIGS. 17a to 19b corresponds to the device previously described with reference to FIGS. 1 to 16, so that, with a view to avoiding repetition, reference is made to the statements made previously. Functionally identical parts or sections have been provided with identical reference symbols, appending the letter "a". In the following, merely the differences of the device according to FIGS. 17a to 19b will be briefly considered. The only difference in the case of the device according to FIGS. 17a to 19b is that the two control runners 12a and 15a have been configured differently to the control runners 12 and 15. However, the same function arises. The control roller 6a is not, as in the case of the device according to FIGS. 1 to 16, firstly turned in a first direction of rotation and subsequently rotated back again. Rather, the control roller 6a is turned in stages in each instance—in the present case, in two stages—in the same direction of rotation via the control runners 12a and 15a for the transfer out of the blocking position of the control slider 9a into the enabling position and again into the blocking position. With reference to FIGS. 17a and 17b, the first end position of the control slider 9a is shown in its position abutting guide slider 7a. FIGS. 18a and 18b show an intermediate position in which the relative motion of the control slider 9a relative to guide slider 7a has been enabled. In FIGS. 19a and 19b, the second end position of the control slider 9a is shown, in which the control slider 9a is adjacent to guide slider 8a and has been blocked again in its relative motion relative to guide sliders 7a and 8a.

The invention claimed is:

1. A device for relocating a display-screen arrangement relative to a vehicle roof in a vehicle interior between a rest position, at least largely parallel to the roof, and an operational position oriented at least largely in the vertical direction of the vehicle, the device comprising:
   a knee-joint arrangement including a main lever, with which main lever the display-screen arrangement is resistant to torsion, and; and
   a control lever connected in an articulated manner to the main lever, each of the main lever and the control lever being supported so as to be movable in rotation about a respective bearing;
   a guide rail, said bearings being traversable along the guide rail in a linearly movable manner; and
   a positive-control device, said bearings being relatively movable with respect to one another along the guide rail via the positive-control device, the positive-control device including a control roller, the control roller extending along the guide rail and being supported so as to be movable in rotation about an axis of rotation oriented parallel to the guide rail, the control roller being mechanically coupled via control cams with the bearings, the bearings being relatively movable with respect to one another.

2. The device according to claim 1, further including two guide sliders, the control roller being supported so as to be movable in rotation on opposing front-end regions between the two guide sliders, the two guide sliders being guided along the guide rail in a longitudinally relocatable manner.

3. The device according to claim 2, wherein one guide slider forms the bearing for the control lever or for the main lever.

4. The device according to claim 3, further including a control of the slider, the control slider forming the other bearing for the main lever or for the control lever, the control slider being guided along the guide rail in a longitudinally relocatable manner.

5. The device according to claim 1, wherein the control cams are configured such that by torsion of the control roller, a relative mobility between the bearings of the main lever and of the control lever is enabled or blocked.

6. The device according to claim 4, wherein, two control cams are provided, the two control cams respectively comprising control runners arranged in a distributed manner over a periphery of the control roller, the control slider including a control pin engaging with a first of the control runners, and the guide rail includes a guide pin fixed with respect to the guide rail and engaging with a second of the control runner.

7. The device according to claim 2, wherein the guide rail has a guide channel, and the control roller, including the guide sliders, is spatially integrated within the guide channel.

8. The device according to claim 4, further including a drive system, the drive system traversing the bearings of the knee-joint arrangement along the guide rail.

9. The device according to claim 8, wherein the drive system includes, in a region of the guide rail, a tension-resistant and pressure-resistant drive-transmission train acting upon the control slider to relocate the control slider and entrain the control roller and the guide sliders.

* * * * *